US012771230B2

(12) United States Patent
Yao et al.

(10) Patent No.: US 12,771,230 B2
(45) Date of Patent: Oct. 20, 2026

(54) TRAPEZOIDAL CURRENT MODE FOR MULTILEVEL DC-DC CONVERTER

(71) Applicants: Nanyang Technological University, Singapore (SG); LITE-ON SINGAPORE PTE. LTD., Singapore (SG); LITE-ON TECHNOLOGY CORPORATION, Taipei (TW)

(72) Inventors: Zhi-Gang Yao, Singapore (SG); Yi Tang, Singapore (SG); Jing Yang, Singapore (SG); Shih-Ming Chen, Taipei (TW); Jung-Chih Wei, Taipei (TW)

(73) Assignees: NANYANG TECHNOLOGICAL UNIVERSITY, Singapore (SG); LITE-ON SINGAPORE PTE. LTD., Singapore (SG); LITE-ON TECHNOLOGY CORPORATION, Taipei (TW)

( * ) Notice: Subject to any disclaimer, the term of this patent is extended or adjusted under 35 U.S.C. 154(b) by 153 days.

(21) Appl. No.: 18/799,391

(22) Filed: Aug. 9, 2024

(65) Prior Publication Data

US 2026/0025069 A1 Jan. 22, 2026

Related U.S. Application Data

(60) Provisional application No. 63/673,832, filed on Jul. 22, 2024.

(51) Int. Cl.

| | |
|---|---|
| ***H02M 1/00*** | (2007.01) |
| ***H02M 3/07*** | (2006.01) |
| ***H02M 3/158*** | (2006.01) |

(52) U.S. Cl.
CPC ....... *H02M 1/0095* (2021.05); *H02M 1/0058* (2021.05); *H02M 3/07* (2013.01); *H02M 3/158* (2013.01)

(58) Field of Classification Search
CPC .... H02M 1/0058; H02M 1/0095; H02M 3/07; H02M 3/158
See application file for complete search history.

(56) References Cited

U.S. PATENT DOCUMENTS

| | | | | |
|---|---|---|---|---|
| 5,204,809 | A | 4/1993 | Andresen | |
| 2021/0288576 | A1* | 9/2021 | Rizzolatti | H02M 1/007 |
| 2022/0231618 | A1* | 7/2022 | Yan | H02M 1/0025 |
| 2022/0278603 | A1* | 9/2022 | Peretz | H02M 1/0009 |

OTHER PUBLICATIONS

Tan et al. "An Integrated Inductor for Eliminating Circulating Current of Parallel Three-Level DC-DC Converter-Based EV Fast Charger", Mar. 2016, IEEE.

* cited by examiner

*Primary Examiner* — Jue Zhang
(74) *Attorney, Agent, or Firm* — WPAT, PC

(57) ABSTRACT

In an aspect of the disclosure, a pulse generator for applying to a multilevel DC-DC converter including a filter is provided. The pulse generator includes a controller and multiple capacitor-switch modules coupled to the controller and configured to receive an input voltage of the multilevel DC-DC converter and output an inductor current with a trapezoidal waveform on an inductor of the filter.

20 Claims, 12 Drawing Sheets

TRAPEZOIDAL CURRENT MODE FOR MULTILEVEL DC-DC CONVERTER

This application claims the benefit of U.S. provisional application Ser. No. 63/673,832, filed Jul. 22, 2024, the subject matter of which is incorporated herein by reference.

TECHNICAL FIELD

The disclosure relates in general to trapezoidal current mode (TZCM) for multilevel dc-dc converter, and more particularly, to techniques of methods and apparatuses about schemes to have an application of controlling capacitor-switch modules of pulse generator of multilevel dc-dc converter to form an inductor current with trapezoidal waveform.

BACKGROUND

With the increasing demand for photovoltaic generation, battery energy storage, DC microgrids, electric vehicles, and ship power supplies, multilevel DC-DC converters have become a research hotspot and an important solution. Multilevel DC-DC converters are developed to address the limitations of traditional two-level converters, such as high voltage stress on power semiconductors and increased switching losses. By utilizing multiple voltage levels in the conversion process, multilevel converters can achieve higher voltage conversion ratios while reducing the voltage stress on individual components.

Traditionally, multilevel DC-DC converters operate in continuous conduction mode (CCM), which leads to hard-switching operations and results in significant switching losses and electromagnetic interference problems. To overcome these drawbacks, some soft-switching techniques are developed, especially zero-voltage switching (ZVS), which are favorable methods to eliminate the turn-on and diode reverse recovery losses. Therefore, ZVS allows for operation at higher switching frequencies without excessive losses. Higher switching frequencies enable the design of more compact and lightweight converters with improved dynamic response and reduced passive component sizes. In addition, when switches operate with ZVS, the abrupt changes in voltage waveforms are mitigated, resulting in smoother waveforms and reduced EMI emissions. In summary, zero-voltage switching plays a crucial role in multilevel DC-DC converters by minimizing switching losses, improving efficiency, reducing EMI emissions, and enabling higher switching frequencies.

However, for the typical ZVS implementation method, some auxiliary components and circuits need to be added to the original multilevel DC-DC converter, resulting in increased hardware complexity and size. To avoid the increased auxiliary circuits, the triangular current mode (TCM) is used to achieve ZVS by enlarging the inductor current ripple. For example, the flying capacitor DC-DC converter is controlled in TCM to realize ZVS without any auxiliary components, but these modes have a large negative current and peak-to-peak current, resulting in large conduction losses and turn-off losses.

Although ZVS can be realized by controlling the converter in TCM, the peak inductor current in the traditional triangular modulation is more than twice the average inductor current, which aggravates the current stress and turn-off losses of the power switch. Thus, there are needs for achieving ZVS in near critical conduction mode (near-CRM) while reducing the peak inductor current.

SUMMARY

The present disclosure describes techniques for application of achieving ZVS in near critical conduction mode (near-CRM) while reducing the peak inductor current. Particularly, a trapezoidal current mode (TZCM) for multilevel DC-DC converters is provided according to some implementations of the present application, which the TZCM makes the inductor current waveform as a trapezoidal current by generating some special combinations of voltage level and sequence.

The first aspect of the present disclosure features a pulse generator for applying to a multilevel DC-DC converter including a filter is provided. The pulse generator comprises a controller and multiple capacitor-switch modules coupled to the controller and configured to receive an input voltage of the multilevel DC-DC converter and output an inductor current with a trapezoidal waveform on an inductor of the filter. The controller measures the input voltage, the output voltage and the inductor current of the multilevel DC-DC converter, calculates three duty cycles, and assigns the three duty cycles to the plurality of capacitor-switch modules to generate a PWM. The PWM correspondingly forms a three level sequence of an output voltage of the pulse generator, and the three level sequence of the output voltage of the pulse generator correspondingly forms the inductor current with the trapezoidal waveform on the inductor of the filter.

The second aspect of the present disclosure features a method for outputting an inductor current with the trapezoidal waveform of a multilevel DC-DC converter. The method comprises measuring, by a controller, an input voltage, an output voltage and the inductor current of the multilevel DC-DC converter. The method also comprises calculating, by the controller, three duty cycles. The method also comprises assigning, by the controller, the three duty cycles to a plurality of capacitor-switch modules of a pulse generator of the multilevel DC-DC converter to generate PWM. The PWM correspondingly forms a three level sequence of an output voltage of the pulse generator, and the three level sequence of the output voltage of the pulse generator correspondingly forms the inductor current with the trapezoidal waveform on an inductor of a filter of the multilevel DC-DC converter.

The details of one or more disclosed implementations are set forth in the accompanying drawings and the description below. Other features, aspects, and advantages will become apparent from the description, the drawings and the claims.

Figure 1:
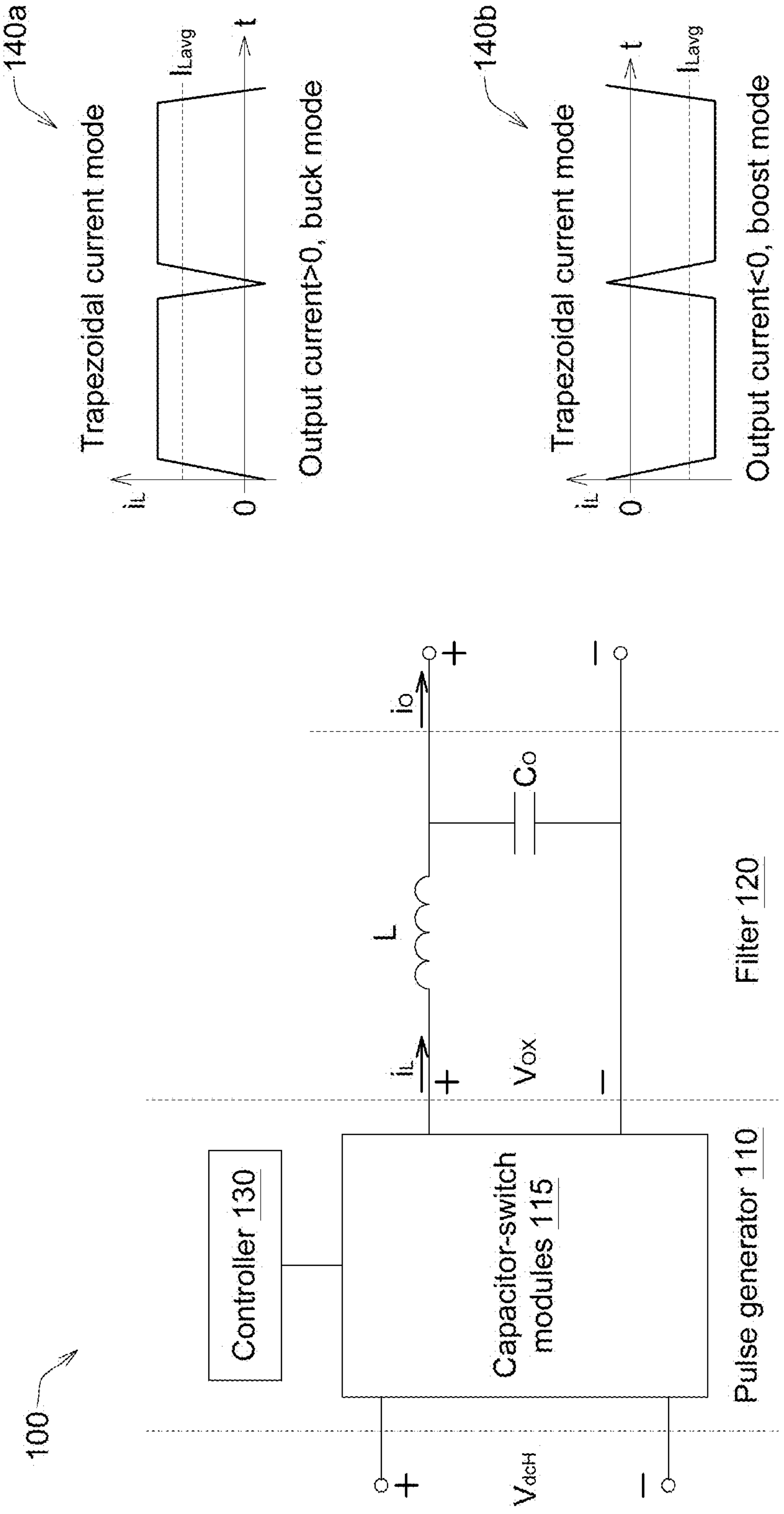
FIG. 1 is a diagram illustrating an example multiple DC-DC converter and waveforms of an inductor current, according to some implementations of the present application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms “comprise,” “comprising,” “include,” “including,” “has,” “having,” etc. used in this specification are open-ended and mean “comprises but not limited.” The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a diagram illustrating an example multilevel DC-DC converter 100 and waveforms 140*a* and 140*b* of an inductor current it. The multilevel DC-DC converter 100 includes a pulse generator 110 and a filter 120. The pulse generator 110 includes a controller 130 and capacitor-switch modules 115 coupled to the controller 130 and configured to receive input voltage $V_{dcH}$ and output the inductor current $i_L$ with the trapezoidal waveform, 140*a* or 140*b*, on an inductor L of the filter 120, to adjust an output voltage $V_{dcL}$ of the filter 120 (of the multiple DC-DC converter 100). As shown in FIG. 1, the pulse generator 110 can be applied to the multilevel DC-DC converter 100. With the pulse generator 110, the multilevel DC-DC converter 100 is enabled to be controlled to generate the inductor current $i_L$ with trapezoidal waveforms 140*a* or 140*b* on the inductor L of the filter 120. The trapezoidal waveform 140*a* or 140*b* on the inductor L of the filter 120 is with reverse peak current compared to the average inductor current $I_{Lavg}$, which can be also referred as a trapezoidal current mode (TZCM). When the output current $i_o$ of the multilevel DC-DC converter 100 is greater than zero (buck mode), the inductor current $i_L$ has two positive peak currents and one negative valley current during each switching cycle, as shown by the trapezoidal waveforms 140*a*. Meanwhile, when the output current $i_o$ of this converter is less than zero (boost mode), the inductor current $i_L$ has two negative valley currents and one positive peak current during each switching cycle, as shown by the trapezoidal waveforms 140*b*. As a result, the techniques provided according to some implementations of the present application not only achieves zero-voltage switching (ZVS), but also reduces the current peak and RMS (root mean square) inductor currents compared with the traditional triangular current mode.

Figure 2:
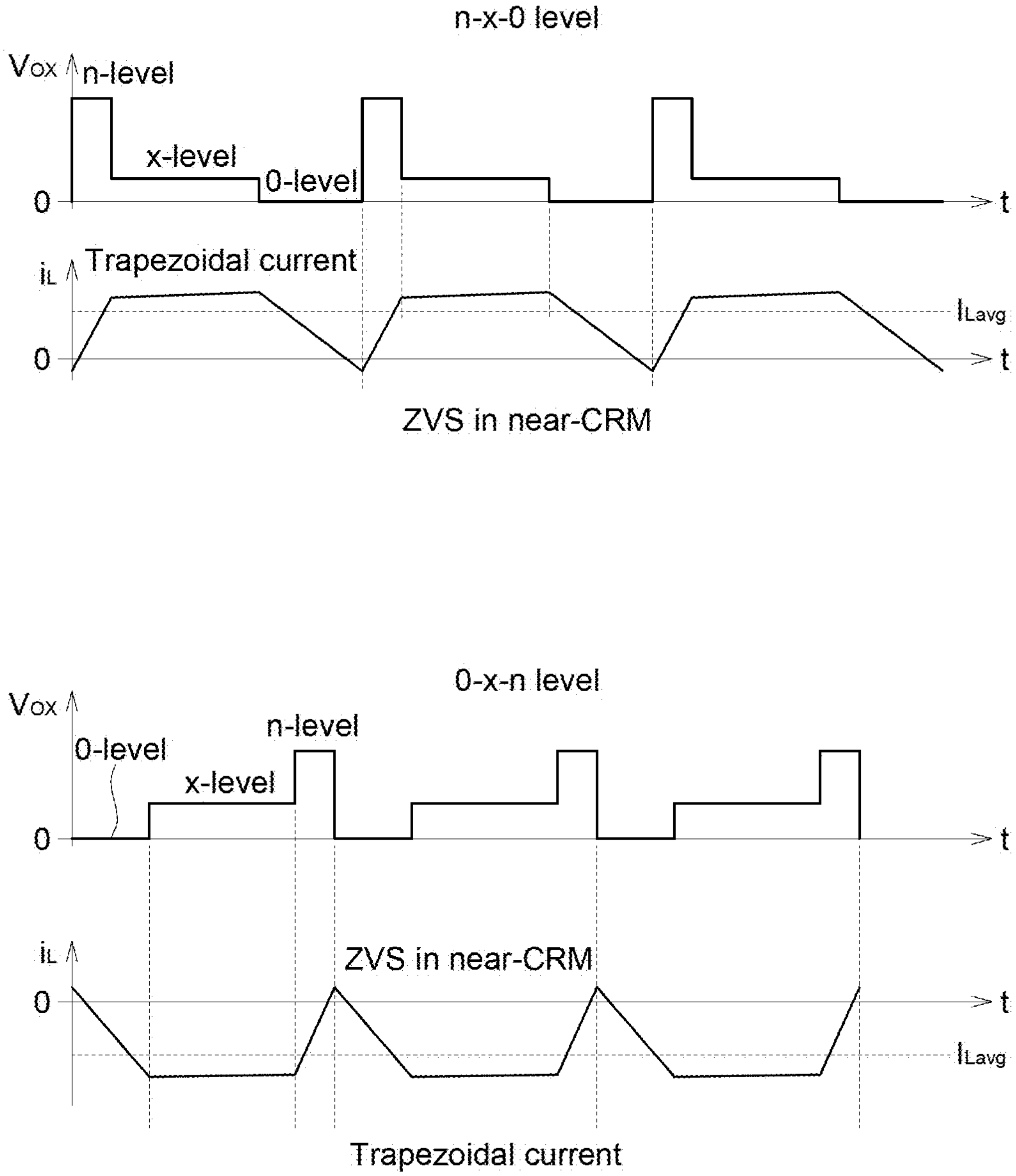
FIG. 2 is a time diagram illustrating example waveforms of an inductor current corresponding to the output voltage of the pulse generator of FIG. 1, according to some implementations of the present application.

FIG. 2 is a time diagram illustrating example waveforms 240*a* and 240*b* of the inductor current $i_L$ corresponding to the output voltage $v_{ox}$ of the pulse generator 110 of FIG. 1. The operating principle of the proposed trapezoidal current mode with $I_{Lavg}>0$ for multilevel DC-DC converters is shown by the waveform 240*a* of FIG. 2, where the input of the multilevel DC-DC converter 100 is converted from $V_{dcH}$ to $V_{dcL}$, as shown in FIG. 1. The output voltage $v_{ox}$ of the multilevel level (such as n+1 level) DC-DC converter comprises n-level, x-level and 0-level sequences, so as to produce an approximate trapezoidal waveform for the inductor current $i_L$. Duty cycles corresponding to different level sequences can be respectively represented by $D_n$, the duty cycle of n-level voltage, $D_x$, the duty cycle of x-level voltage, and $D_0$, the duty cycle of 0-level voltage.

For the multilevel level (such as n+1 level) DC-DC converter 100, there are 0, 1, 2, . . . , n voltage levels. The middle voltage level (x-level voltage) in the trapezoidal current mode can be determined by the input voltage $V_{dcH}$ and output voltage $V_{dcL}$ of the multilevel converter 100. For an optimal voltage level solution, the ideal x-level can be given as:

$$x = \frac{nV_{dcL}}{V_{dcH}}$$

Since x must be an integer while satisfying $1 \leq x \leq n-1$, it can be rounded as:

$$x = \begin{cases} 1, & \frac{nV_{dcL}}{V_{dcH}} < 0.5 \\ \text{round}\left(\frac{nV_{dcL}}{V_{dcH}}\right), & 0.5 \le \frac{nV_{dcL}}{V_{dcH}} < n - 0.5 \\ n-1, & \frac{nV_{dcL}}{V_{dcH}} \ge n - 0.5 \end{cases}$$

where the round ( ) function is a rounding function, such as round (1.4)=1 and round (1.5)=2.

The operating principle of the proposed trapezoidal current mode with $I_{Lavg}<0$ for multilevel DC-DC converters is shown by the waveform 240*b* of FIG. 2, where the input of the multilevel DC-DC converter 100 is converted from $V_{dcL}$ to $V_{dcH}$. The output voltage $v_{ox}$ of the multilevel level (such as n+1 level) DC-DC converter comprises 0-level, x-level and n-level sequences, so a trapezoidal waveform for the inductor current $i_L$ with negative average current $I_{Lavg}$ is generated.

Figure 3:
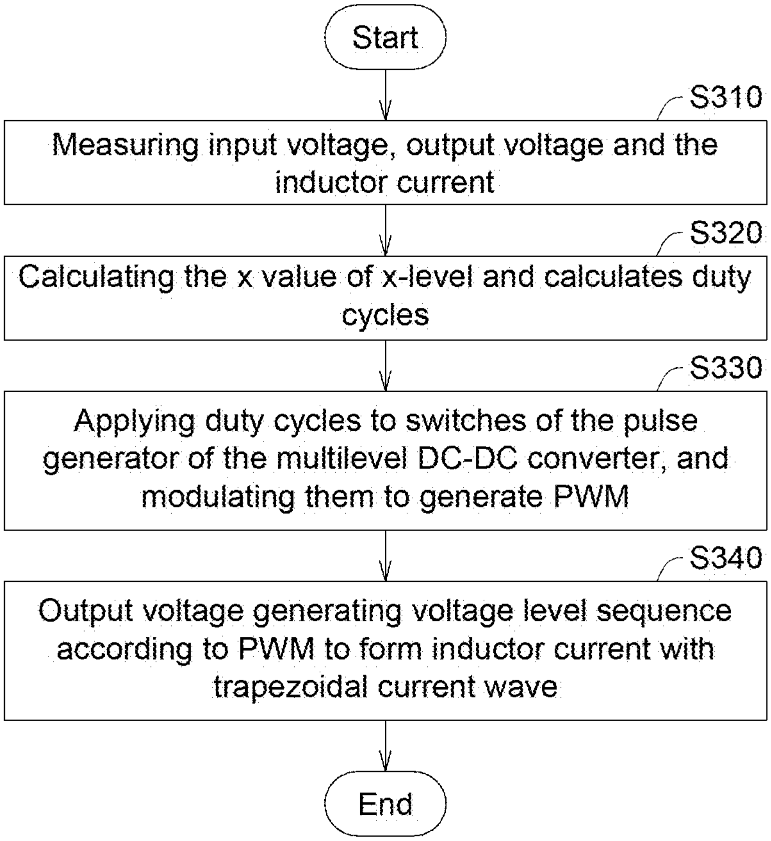
FIG. 3 is a flowchart of a method (process) for controlling the trapezoidal current mode for multilevel DC-DC converters, according to some implementations of the present application.

FIG. 3 is a flowchart of a method (process) 300 for controlling the trapezoidal current mode for multilevel DC-DC converters (such as the multilevel DC-DC converter 100 of FIG. 1, or multilevel DC-DC converters 400*a*, 400*b* or 400*c* in FIG. 4A, 4B or 4C), according to some implementations of the present application. In step S310, a controller (such as the controller 130 of FIG. 1) measures the input voltage (such as the input voltage $V_{dcH}$ of FIG. 1), the output voltage (such as the input voltage $V_{dcL}$ of FIG. 1), and the inductor current (such as the inductor current $i_L$ of FIG. 1). In step S320, the controller calculates the x value of x-level and calculates duty cycles: $D_n$, $D_x$ and $D_0$. In step S330, the controller applies duty cycles, $D_n$, $D_x$ and $D_0$, to switches of the pulse generator of the multilevel DC-DC converter, and then modulate them to generate PWM. In step S340, the output voltage vox generates a voltage level sequence: n-level, x-level, 0-level according to PWM to form the inductor current with a trapezoidal current wave.

Figure 4A:
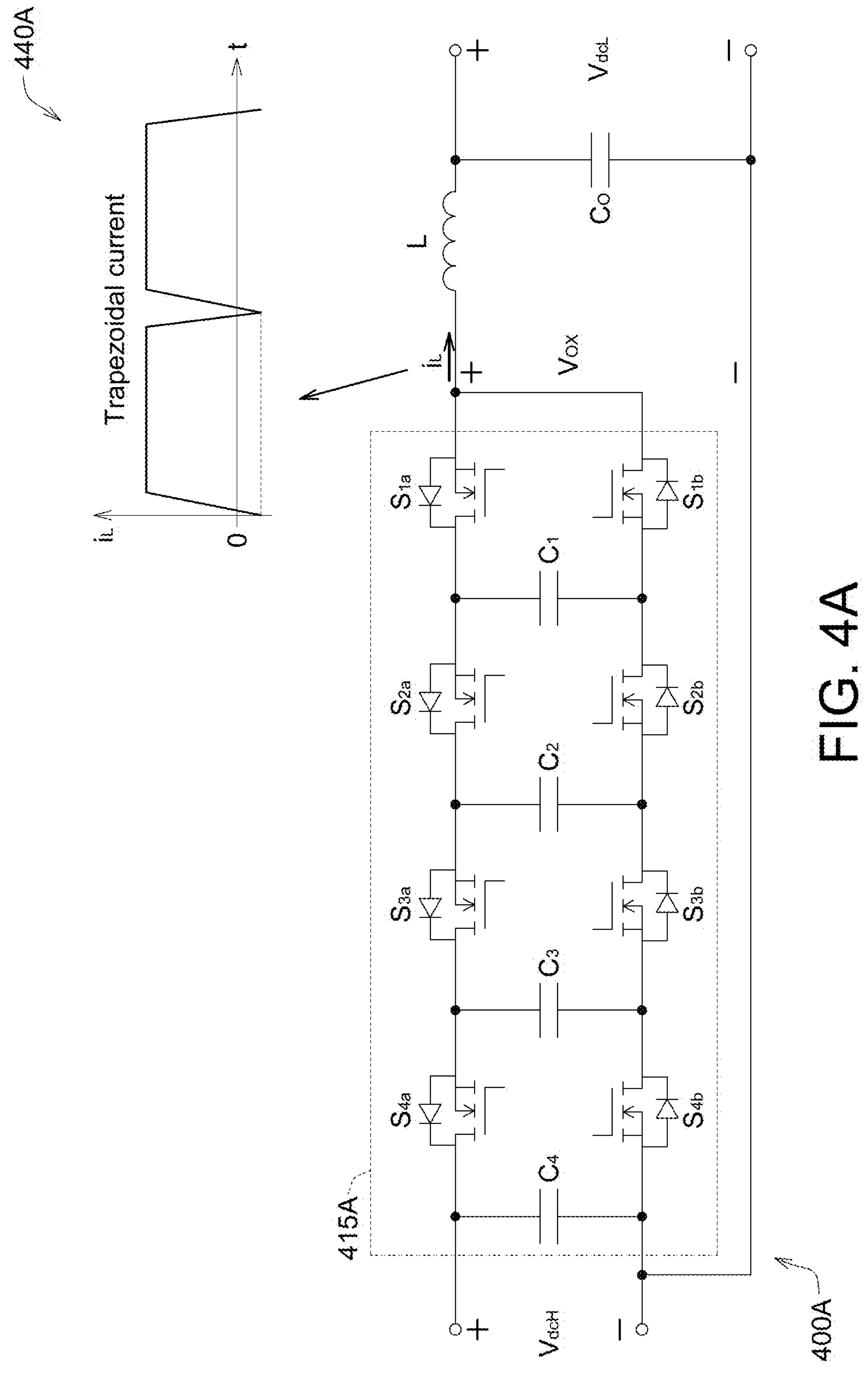
FIGS. 4A to 4C are circuit diagrams illustrating example capacitor-switch modules for the pulse generator of the multilevel DC-DC converter, according to some implementations of the present application.
Figure 4B:
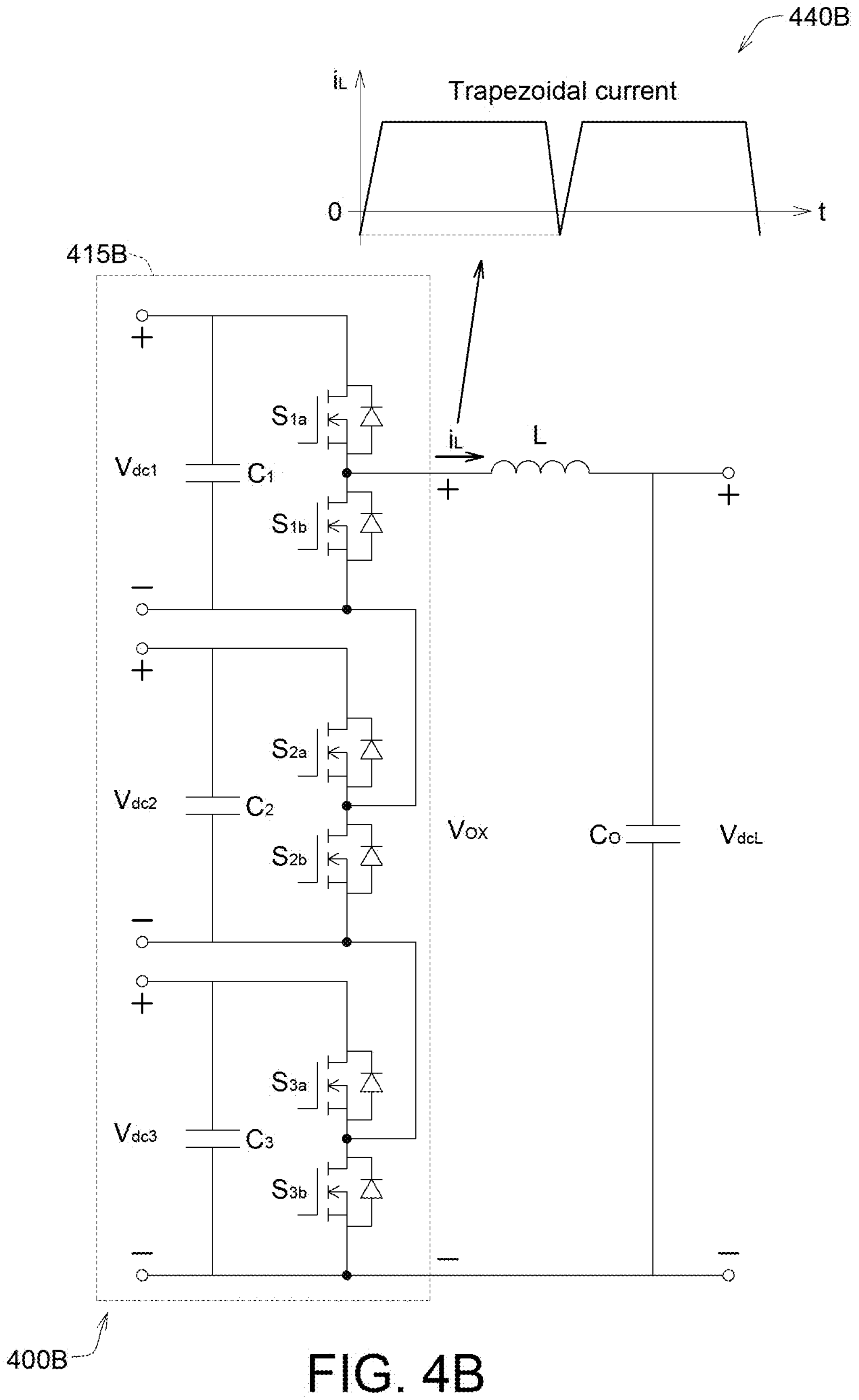
Figure 4C:
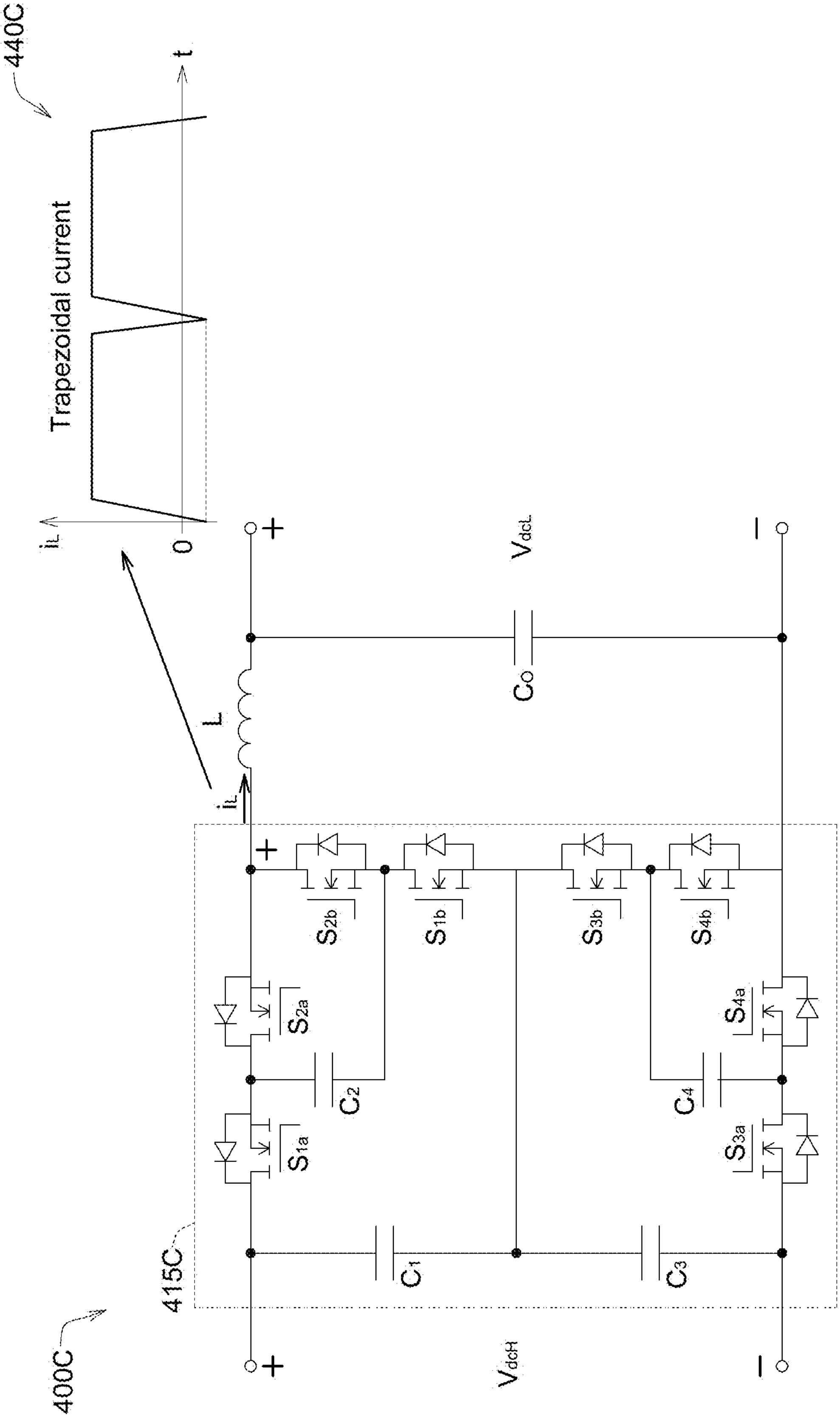

FIGS. 4A to 4C are circuit diagrams illustrating example capacitor-switch modules, 415A, 415B and 415C, for the pulse generator of the multilevel DC-DC converters, according to some implementations of the present application, which the foresaid trapezoidal current mode can be applied to various multilevel DC-DC converters. FIG. 4A shows an example topology of a flying-capacitor five-level DC-DC converter 400A with a trapezoidal current waveform 440A. In FIG. 4A, capacitor-switch modules 415A for the flying-capacitor five-level DC-DC converter 400A are implemented by 4 capacitor-switch modules which are serially connected. Each capacitor-switch module includes 1 pair of switches and one capacitor. For example, one of the capacitor-switch modules 415A includes pair of switches, $S_{4a}$ and $S_{4b}$, and the capacitor $C_4$. Each pair of switches is a complementary pair of transistors, which operates in opposite level (such as one is high while the other is low, and vice versa). The gate of each switches ($S_{1a}$ to $S_{4b}$) is coupled to a controller (such as the controller 130 of FIG. 1) to receive duty cycles D as discussed above. The output voltage $v_{ox}$ of the flying-capacitor five-level DC-DC converter 400A is formed corresponding to given voltage level sequences according to the time diagram with waveforms 240*a* or 240*b* in FIG. 2. The inductor current $i_L$ is with the trapezoidal current waveform 440A, and it has positive and negative peak inductor current values during every switching cycle so that all switches can achieve ZVS as shown in FIG. 4A.

FIG. 4B shows an example topology of a cascaded half-bridge multilevel DC-DC converter 400B with a trapezoidal current waveform 440B. In FIG. 4B, capacitor-switch modules 415B for the cascaded half-bridge multilevel DC-DC converter 400B are implemented by 3 capacitor-switch modules which are parallelly connected. Each capacitor-switch module includes a pair of switches and one capacitor. For example, one of the capacitor-switch modules 415B includes pair of switches, $S_{1a}$ and $S_{1b}$, and the capacitor $C_1$. Each pair of switches is a complementary pair of transistors, which operates in opposite level (such as one is high while the other is low, and vice versa). The gate of each switches ($S_{1a}$ to $S_{3b}$) is coupled to a controller (such as the controller 130 of FIG. 1) to receive duty cycles D as discussed above. By adjusting the turn-on combination of power switches, the output voltage $v_{ox}$ can form the inductor current $i_L$ with a trapezoidal current waveform 440B. The voltage level sequences are also according to the time diagram with waveforms 240*a* or 240*b* in FIG. 2, and all switches ($S_{1a}$ to $S_{3b}$) in the cascaded half-bridge multilevel DC-DC converter 400B can achieve ZVS during every switching cycle.

FIG. 4C shows an example hybrid five-level DC-DC converter 400C with midpoint clamp and flying-capacitor and its trapezoidal current waveform 440C. In FIG. 4C, capacitor-switch modules 415C for the hybrid five-level DC-DC converter 400C are implemented by 4 capacitor-switch modules with midpoint clamps and flying-capacitors. Each capacitor-switch module includes 2 pair of switches and one capacitor. For example, one of the capacitor-switch modules 415C includes pair of switches, Sia and $S_{1b}$, and the capacitor $C_1$. Each pair of switches is a complementary pair of transistors, which operates in opposite level (such as one is high while the other is low, and vice versa). The gate of each switches ($S_{1a}$ to $S_{4b}$) is coupled to a controller (such as the controller 130 of FIG. 1) to receive duty cycles D as discussed above. According to the voltage level sequences of the time diagram with waveforms 240*a* or 240*b* in FIG. 2, the inductor current $i_L$ with the trapezoidal current waveform 440C can be generated by controlling the states of the switches ($S_{1a}$ to $S_{4b}$). All switches in the hybrid five-level DC-DC converter 400C can also achieve ZVS during every switching cycle.

In some implementations, the modulation of the trapezoidal current mode for the hybrid five-level DC-DC converter 400C can be divided into three zones: $0<D<3/8$, $3/8 \le D<5/8$, and $5/8 \le D<1$. The equivalent duty cycle is $D=V_{dcL}/V_{dcH}$. The three zones correspond to voltage levels 1, 2, and 3, respectively. The waveforms of the modulated time diagrams with different duty cycles D will be detailed described referring to the FIGS. 5A to 5C as follows.

Figure 5A:
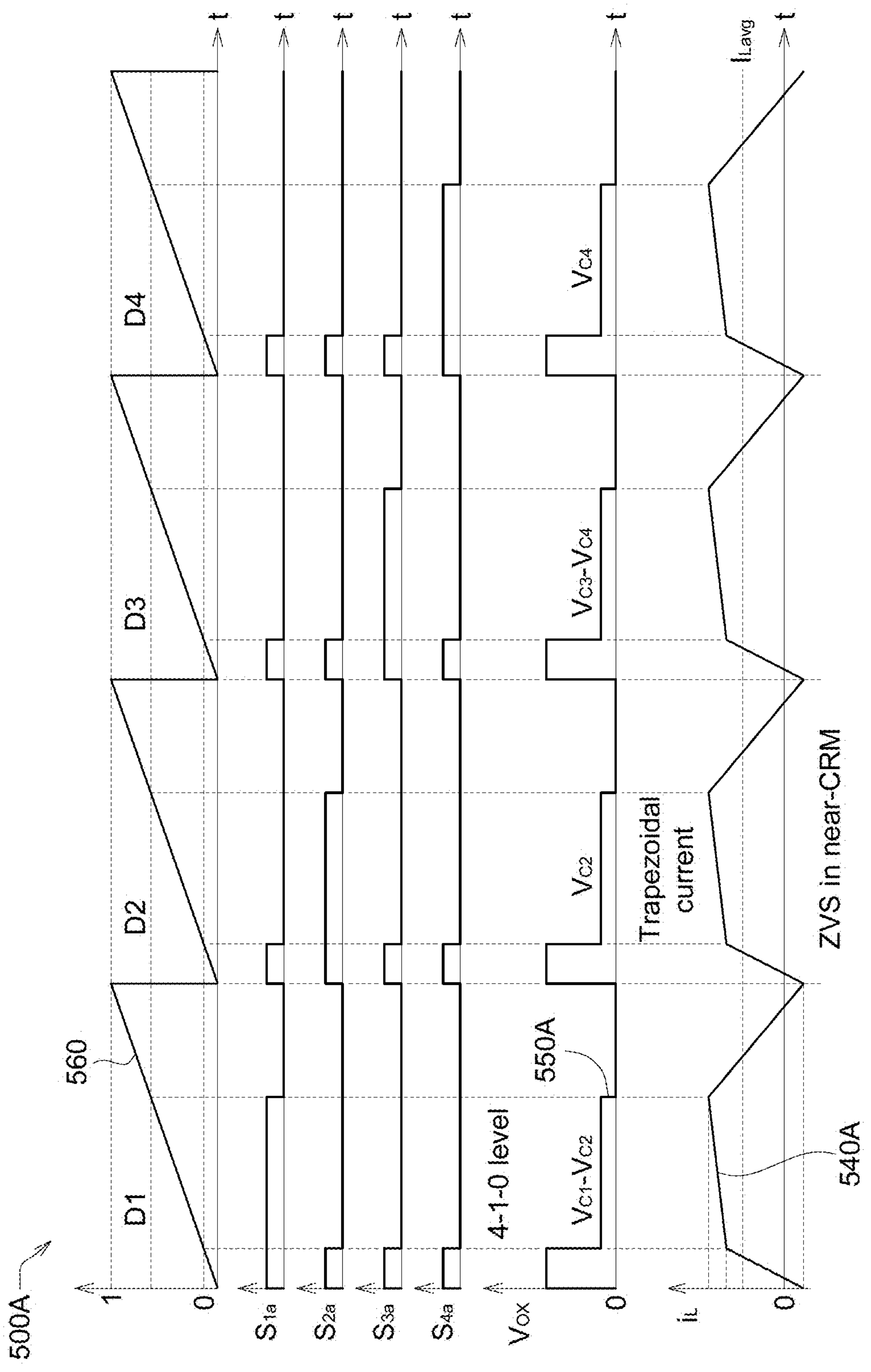
FIGS. 5A to 5C are modulated time diagrams illustrating waveforms with different duty cycles applied to the hybrid five-level DC-DC converter of FIG. 4C, according to some implementations of the present application.
Figure 5B:
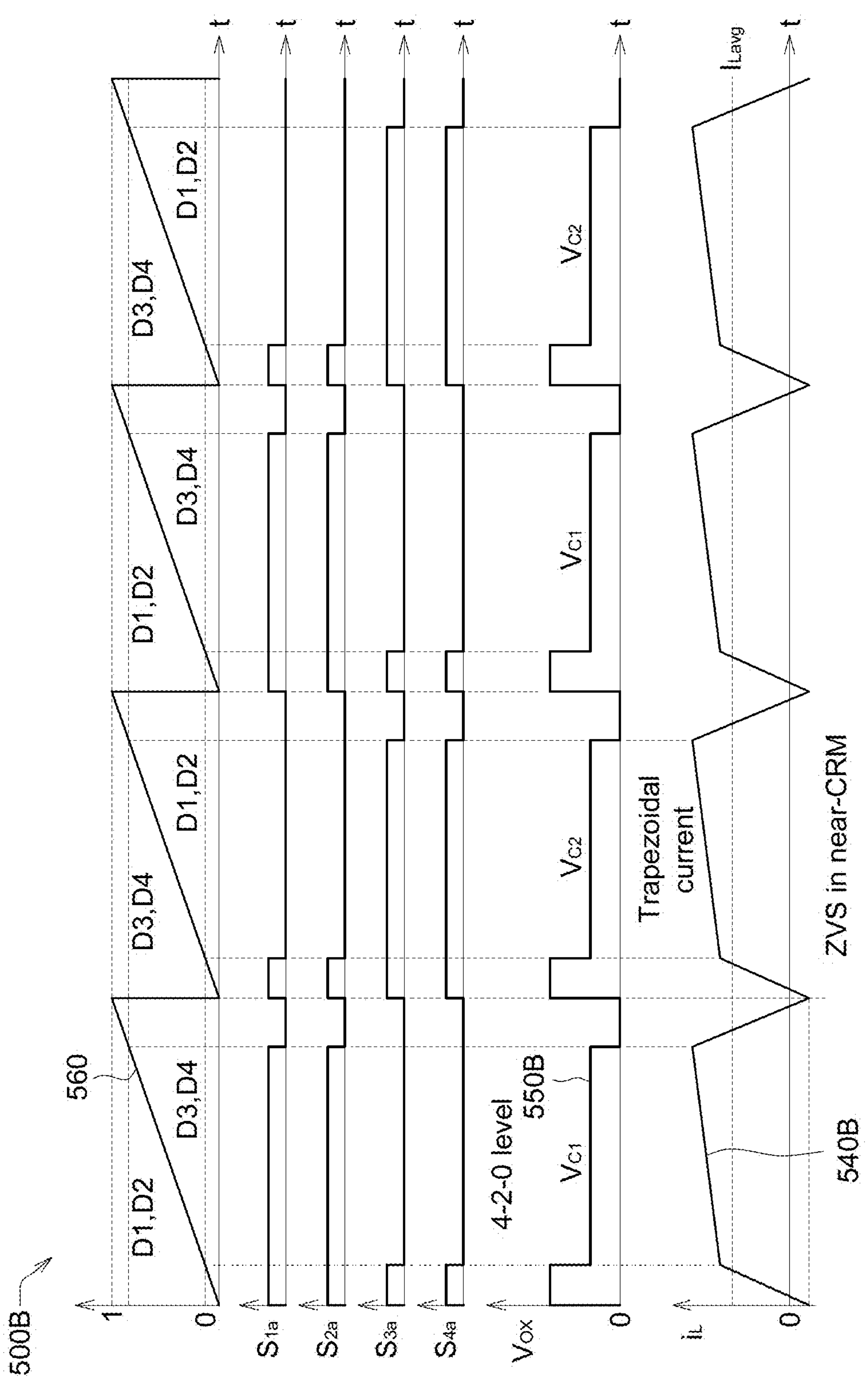
Figure 5C:
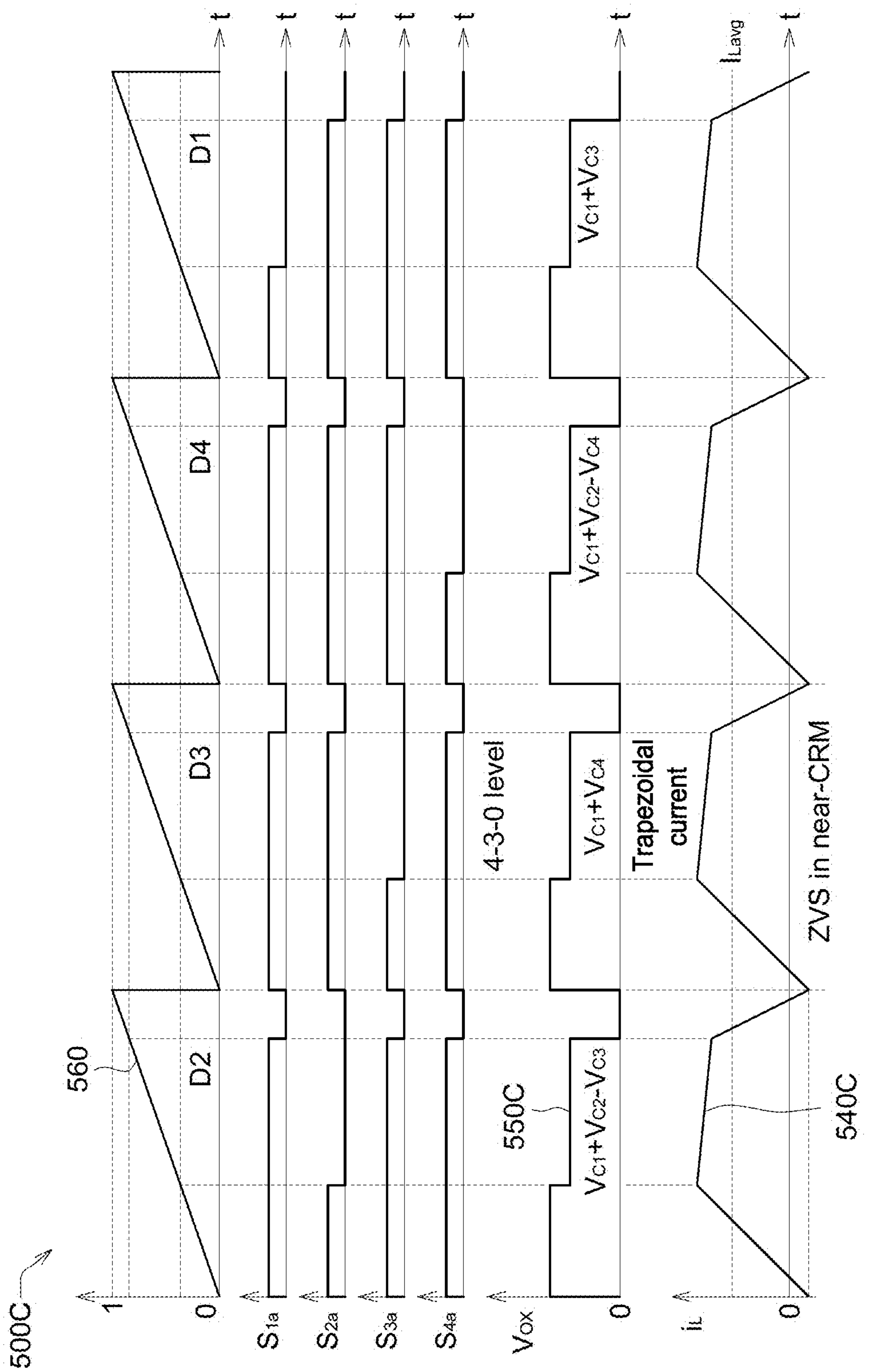

FIGS. 5A to 5C are modulated time diagrams illustrating waveforms with different duty cycles D applied to the hybrid five-level DC-DC converter of FIG. 4C, according to some implementations of the present application. FIG. 5A shows modulated time diagram 500A in trapezoidal current mode with $0<D<3/8$ for the hybrid five-level DC-DC converter 400C of FIG. 4C. The PWMs of four main switches, $S_{1a}$, $S_{2a}$, $S_{3a}$ and $S_{4a}$, are generated by comparing the duty cycles $D_1$, $D_2$, $D_3$, $D_4$ and carrier waveform 560, where $D_1$, $D_2$, $D_3$ and $D_4$ are the duty cycles of the main switches $S_{1a}$, $S_{2a}$, $S_{3a}$ and $S_{4a}$, respectively. In every four switching cycles, these four duty cycles alternate with each other to form a 4-1-0 voltage level. In some implementations, the inductor current $i_L$ is enabled to become a trapezoidal waveform 540A with the voltage level sequence 550A. In this case, the four capacitors ($C_1$ to $C_4$ of FIG. 4C) are enabled to be charged and discharged in an equalized manner so that the four capacitor voltages, $V_{c1}$ to $V_{c4}$, are balanced.

FIG. 5B shows modulated time diagram 500B in trapezoidal current mode with 3/8≤D<5/8 for the hybrid five-level DC-DC converter 400C of FIG. 4C. The PWMs of four main switches, $S_{1a}$, $S_{2a}$, $S_{3a}$ and $S_{4a}$, are generated by comparing the duty cycle $D_1$, $D_2$, $D_3$, $D_4$ and carrier waveform 560, where $D_1$, $D_2$, $D_3$ and $D_4$ are the duty cycles of the main switches $S_{1a}$, $S_{2a}$, $S_{3a}$ and $S_{4a}$, respectively. In every four switching cycles, these four duty cycles alternate with each other to form a 4-2-0 voltage level. In some implementations, the inductor current it is enabled to become a trapezoidal waveform 540B with the voltage level sequence 550B. Thus, the hybrid five-level DC-DC converter 400C is enabled in trapezoidal current mode. In this case, the four capacitors ($C_1$ to $C_4$ of FIG. 4C) are enabled to be charged and discharged in an equalized manner so that the four capacitor voltages, $V_{c1}$ to $V_{c4}$, are balanced.

FIG. 5C shows modulated time diagram 500C in trapezoidal current mode with 5/8≤D<1 for the hybrid five-level DC-DC converter 400C of FIG. 4C. The PWMs of four main switches, $S_{1a}$, $S_{2a}$, $S_{3a}$ and $S_{4a}$, are generated by comparing the duty cycle $D_1$, $D_2$, $D_3$, $D_4$ and carrier waveform 560, where $D_1$, $D_2$, $D_3$ and $D_4$ are the duty cycles of the main switches $S_{1a}$, $S_{2a}$, $S_{3a}$ and $S_{4a}$, respectively. In every four switching cycles, these four duty cycles alternate with each other to form a 4-3-0 voltage level. In some implementations, the inductor current $i_L$ is enabled to become a trapezoidal waveform 540C with the voltage level sequence 550C. Thus, the hybrid five-level DC-DC converter 400C is enabled in trapezoidal current mode. In this case, the four capacitors ($C_1$ to $C_4$ of FIG. 4C) are enabled to be charged and discharged in an equalized manner so that the four capacitor voltages, $V_{c1}$ to $V_{c4}$, are balanced.

In order to keep the four capacitor voltages ($C_1$ to $C_4$ of FIG. 4C) being balanced as discussed, these four duty cycles ($D_1$, $D_2$, $D_3$ and $D_4$) alternate with each other in every four switching cycles, as shown in FIGS. 5A to 5C. The alternating effect is to produce a voltage level in different combinations of capacitor of capacitors. Thus, capacitors can be charged and discharged in a balanced manner.

Figure 6:
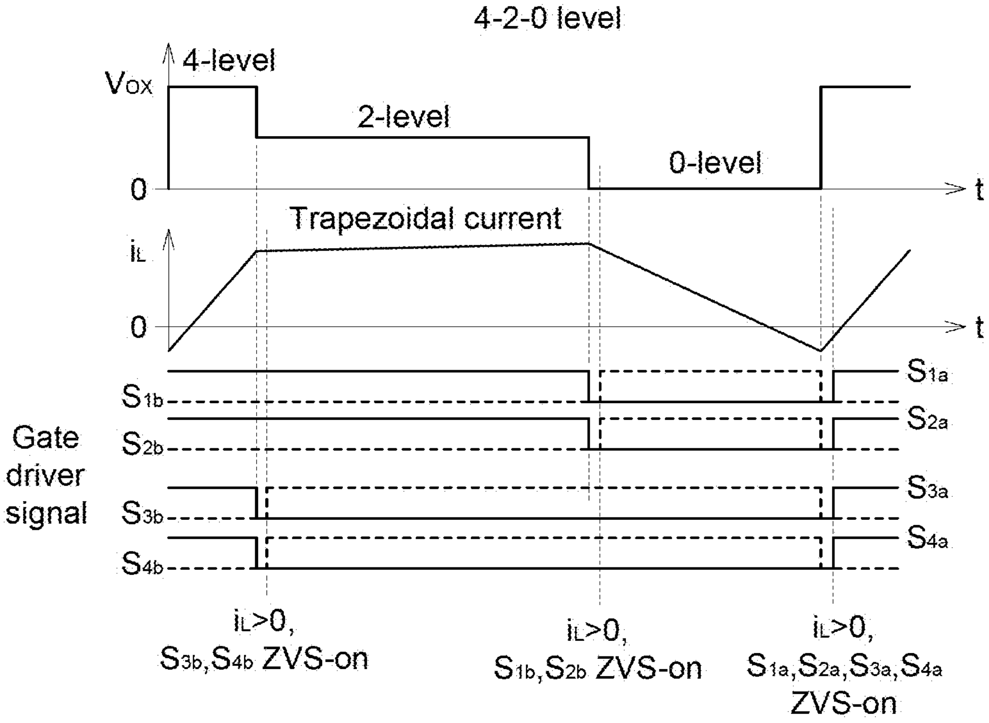
FIG. 6 is a time diagram illustrating ZVS soft-switching in the trapezoidal current mode with the hybrid five-level DC-DC converter of FIG. 4C, according to some implementations of the present application.

FIG. 6 is a time diagram 600 illustrating ZVS soft-switching in the trapezoidal current mode with the hybrid five-level DC-DC converter 400C of FIG. 4C, according to some implementations of the present application. As shown by FIG. 6, in the case of four duty cycles alternated with each other to form a 4-2-0 voltage level, all switches of the hybrid five-level DC-DC converter 400C are enabled to achieve ZVS soft-switching in the trapezoidal current mode. As shown in FIG. 4C, the hybrid five-level DC-DC converter 400C have eight switches ($S_{1a}$ to, $S_{4b}$). Around the valley current with negative value of inductor current $i_L$, the inductor current $i_L$ flows through the body diodes of the four switches, $S_{1a}$, $S_{2a}$, $S_{3a}$ and $S_{4a}$, during the cut-off time, so the voltages of these four switches, $S_{1a}$, $S_{2a}$, $S_{3a}$ and $S_{4a}$, are zero. Thus, when the four switches, $S_{1a}$, $S_{2a}$, $S_{3a}$ and $S_{4a}$, are turned on at the negative valley current of inductor current $i_L$, they can achieve ZVS soft-switching.

Similarly, at the first peak current with positive value of inductor current $i_L$, the inductor current $i_L$ flows through the body diodes of the two switches, $S_{3b}$ and $S_{4b}$, during the cut-off time, so the voltages of these two switches, $S_{3b}$ and $S_{4b}$, are zero. At the second peak current with positive value of inductor current $i_L$, the inductor current $i_L$ flows through the body diodes of the two switches, $S_{1b}$ and $S_{2b}$, during the cut-off time, so the voltages of these two switches, $S_{1b}$ and $S_{2b}$, are also zero. Therefore, when the four switches, $S_{1b}$, $S_{2b}$, $S_{3b}$ and $S_{4b}$, are turned on at the positive peak current of inductor current it, they can also achieve ZVS soft-switching.

Figure 7:
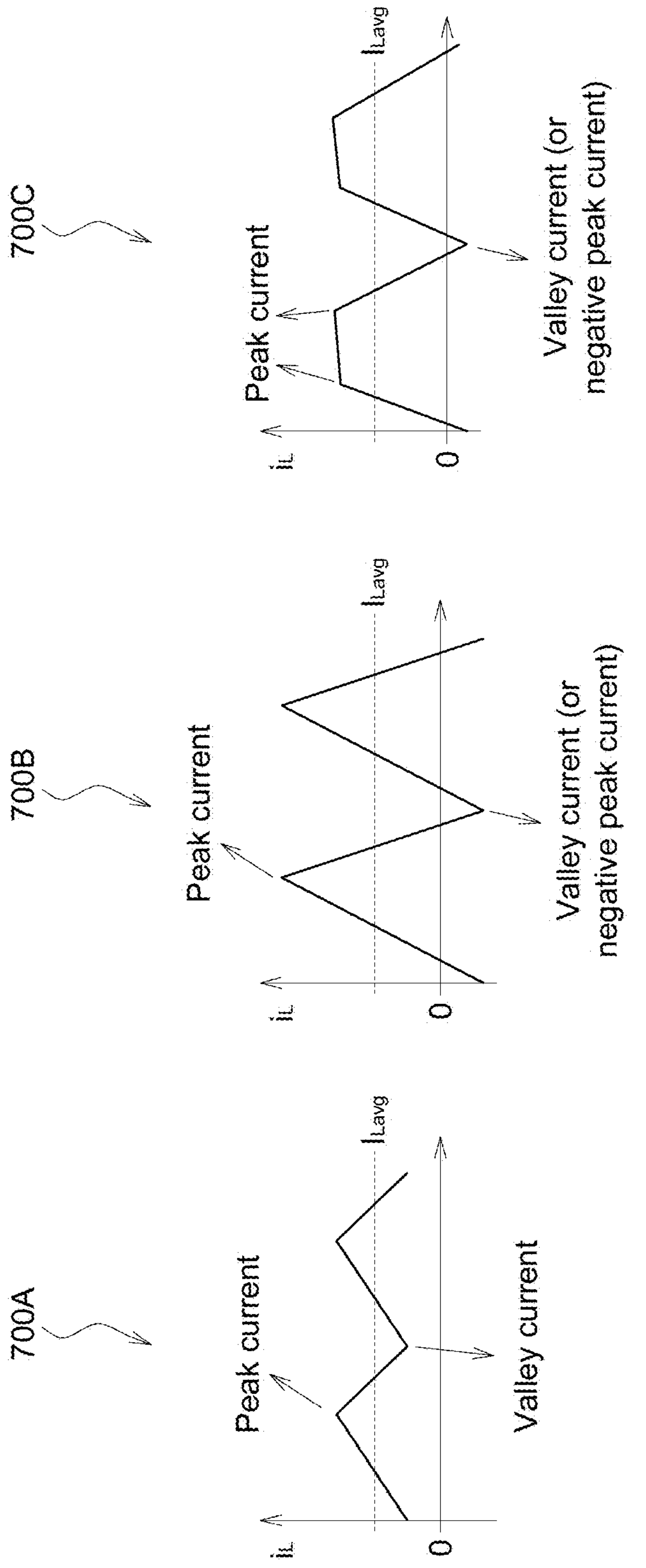
FIG. 7 is a diagram illustrating waveforms comparison between the conventional mode, CCM and TCM, and the TZCM according to some implementations of the present application.

FIG. 7 is a diagram illustrating waveforms, 700A, 700B and 700C, comparison between the conventional modes, CCM and TCM, and the TZCM according to some implementations of the present application. For the same circuit topology, different operating principles (CCM, TCM or TZCM) result in different inductor current waveforms, as shown in FIG. 7. The conventional mode (CCM) in multilevel DC-DC converters operates in hard-switching state, which results in significant switching losses and electromagnetic interference problems. Although the other conventional mode (TCM) can achieve zero-voltage switching, the peak inductor current $i_L$ is more than twice the average inductor current $I_{Lavg}$ aggravating the current stress and turn-off losses of the power switch. The multilevel DC-DC converters in both CCM and TCM have a triangular inductor current $i_L$ waveform, such as waveform 700A or 700B.

As discussed above, the inductor current is formed by the foresaid techniques according to some implementations of present application, is a trapezoidal current waveform, such as waveform 700C. Comparing with the conventional mode, TCM, the TZCM has a lower peak current and RMS current of the inductor for the same average current $I_{Lavg}$. The TZCM not only reduces the switching losses by operating all switches in ZVS, but also reduces the conduction and turn-off losses of power switches by lowering the inductor current peak and RMS values. The power losses of the inductor and the capacitors in the multilevel DC-DC converters) in TZCM with ZVS are reduced compared to TCM. By implementing ZVS and reducing the peak turn-off current to the TZCM, the electromagnetic interference problems of TZCM are also mitigated compared to conventional modes, CCM and TCM.

Figure 8:
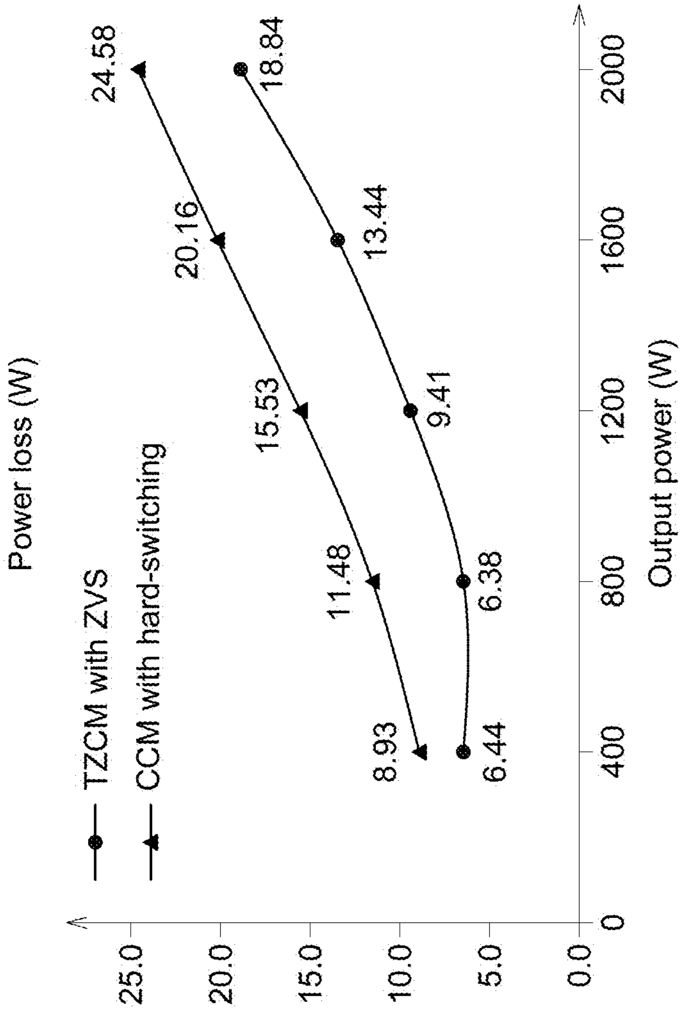
FIG. 8 is a graph illustrating power loss comparison between conventional CCM with hard-switch and TZCM with ZVS according to some implementations of the present application.

FIG. 8 is a graph 800 illustrating power loss comparison between conventional mode, CCM, with hard-switch and TZCM with ZVS according to some implementations of the present application. As shown by graph 800, in the comparison of power losses of operating modes, TZCM with ZVS and CCM with hard-switching, for multilevel DC-DC converters, the test results of power losses is at D=½ and for the three-level DC-DC converter as an example. It shows that the power losses of TZCM with ZVS are lower than those of CCM with hard-switching. Therefore, the TZCM according to some implementations of present application facilitates power losses reducing and efficiency improving. Accordingly, the techniques of TZCM according to some implementations of present application can be applied to multilevel DC-DC converters without changing the topology of these converters. The topology of the circuit remains the same as before, but the operation mode of these converters has been changed to TZCM so that the inductor current becomes a trapezoidal wave.

The techniques of TZCM according to some implementations of present application can be applied to all multilevel DC-DC converters, such as flying-capacitor DC-DC converters, cascaded H-bridge/half-bridge DC-DC converters, and neutral-point-clamped DC-DC converters. They are typical used in photovoltaic generation, battery energy storage, DC microgrids, electric vehicles, chip power supplies, ultracapacitors, and other industrial applications.

Therefore, techniques of TZCM according to some implementations of present application can achieve a high-efficiency power conversion by ZVS advantage and reduced peak and RMS currents. For various multilevel DC-DC converters, the TZCM mode can be implemented by setting specified voltage levels and sequences as discussed above, such that the multilevel DC-DC topology is unrestricted and can be any type of multilevel topology, such as the flying capacitor, cascaded H-bridge/half-bridge, and neutral-point-clamped configurations for multilevel DC-DC converters.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors, processing units, engines, and accelerators suitable for the execution of a computer program include, by way of example, both general and special purpose microprocessors, and any one or more processors of any kind of digital computer. Generally, a processor, a processing unit, an engine, or an accelerator will receive instructions and data from a read only memory or a random access memory or both. The essential elements of a computer can include a processor, a processing unit, an engine, or an accelerator for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor, the processing unit, the engine, or the accelerator and the memory can be supplemented by, or incorporated in, special purpose logic circuitry, such as other processors, processing units, engines, or accelerators.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A pulse generator for applying to a multilevel DC-DC converter including a filter, comprising:

a controller; and a plurality of capacitor-switch modules, coupled to the controller and configured to receive an input voltage of the multilevel DC-DC converter and output an inductor current with a trapezoidal waveform on an inductor of the filter, wherein the controller measures the input voltage, the output voltage and the inductor current of the multilevel DC-DC converter, calculates three duty cycles, and assigns the three duty cycles to the plurality of capacitor-switch modules to generate a pulse-width modulation (PWM), wherein the PWM correspondingly forms a three level sequence of an output voltage of the pulse generator, and the three level sequence of the output voltage of the pulse generator correspondingly forms the inductor current with the trapezoidal waveform on the inductor of the filter.

2. The pulse generator of claim 1, wherein the trapezoidal waveform on the inductor of the filter is with reverse peak current compared to an average inductor current, wherein when an output current of the multilevel DC-DC converter is greater than zero, the inductor current has two positive peak currents and one negative valley current during the duty cycles.

3. The pulse generator of claim 2, wherein the duty cycles are sequentially corresponding to an n-level, an x-level and a 0-level, of an output voltage of the pulse generator, wherein the n-level of the output voltage of the pulse generator is higher than the x-level of the output voltage of the pulse generator, and the x-level of the output voltage of the pulse generator is higher than the 0-level of the output voltage of the pulse generator.

4. The pulse generator of claim 3, wherein the n-level of the output voltage of the pulse generator is corresponding to a rising edge of the trapezoidal waveform, wherein the x-level of the output voltage of the pulse generator is corresponding to a positive peak period of the trapezoidal waveform, wherein the 0-level of the output voltage of the pulse generator is corresponding to a falling edge of the trapezoidal waveform.

5. The pulse generator of claim 1, wherein the trapezoidal waveform on the inductor of the filter is with positive peak current compared to an average inductor current, wherein when an output current of the multilevel DC-DC converter is less than zero, the inductor current includes two negative valley currents and one positive peak current during the duty cycles.

6. The pulse generator of claim 5, wherein the duty cycles are sequentially corresponding to a 0-level, an x-level and an n-level, of an output voltage of the pulse generator, wherein the 0-level of the output voltage of the pulse generator is less than the x-level of the output voltage of the pulse generator, and the x-level of the output voltage of the pulse generator is less than the n-level of the output voltage of the pulse generator.

7. The pulse generator of claim 6, wherein the 0-level of the output voltage of the pulse generator is corresponding to a falling edge of the trapezoidal waveform, wherein the x-level of the output voltage of the pulse generator is corresponding to a negative peak period of the trapezoidal waveform, wherein the n-level of the output voltage of the pulse generator is corresponding to a rising edge of the trapezoidal waveform.

8. The pulse generator of claim 1, wherein the plurality of capacitor-switch modules include four serially connected capacitor-switch modules, and each of the four parallel connected capacitor-switch modules includes a complementary pair of switches and one capacitor, wherein a gate of each switch of the four parallel connected capacitor-switch modules is coupled to the controller to receive the duty cycles.

9. The pulse generator of claim 1, wherein the plurality of capacitor-switch modules include three parallelly connected capacitor-switch modules, and each of the three parallel connected capacitor-switch modules includes a complementary pair of switches and one capacitor, wherein a gate of each switch of the three parallelly connected capacitor-switch modules is coupled to the controller to receive the duty cycles.

10. The pulse generator of claim 1, wherein the plurality of capacitor-switch modules include four capacitor-switch modules with midpoint clamps and flying capacitors, and each of the four capacitor-switch modules includes a complementary pair of switches and one capacitor, wherein a gate of each switch of the three parallelly connected capacitor-switch modules is coupled to the controller to receive the duty cycles.

11. A method for outputting an inductor current with the trapezoidal waveform of a multilevel DC-DC converter, comprising:

measuring, by a controller, an input voltage, an output voltage and the inductor current of the multilevel DC-DC converter;

calculating, by the controller, three duty cycles; and assigning, by the controller, the three duty cycles to a plurality of capacitor-switch modules of a pulse generator of the multilevel DC-DC converter to generate a pulse-width modulation (PWM), wherein the PWM correspondingly forms a three level sequence of an output voltage of the pulse generator, and the three level sequence of the output voltage of the pulse generator correspondingly forms the inductor current with the trapezoidal waveform on an inductor of a filter of the multilevel DC-DC converter.

12. The method of claim 11, wherein the trapezoidal waveform on the inductor of the filter is with reverse peak current compared to an average inductor current, wherein when an output current of the multilevel DC-DC converter is greater than zero, the inductor current includes two positive peak currents and one negative valley current during the duty cycles.

13. The method of claim 12, wherein the duty cycles are sequentially corresponding to an n-level, an x-level and a 0-level, of an output voltage of the pulse generator, wherein the n-level of the output voltage of the pulse generator is higher than the x-level of the output voltage of the pulse generator, and the x-level of the output voltage of the pulse generator is higher than the 0-level of the output voltage of the pulse generator.

14. The method of claim 13, wherein the n-level of the output voltage of the pulse generator is corresponding to a rising edge of the trapezoidal waveform, wherein the x-level of the output voltage of the pulse generator is corresponding to a positive peak period of the trapezoidal waveform, wherein the 0-level of the output voltage of the pulse generator is corresponding to a falling edge of the trapezoidal waveform.

15. The method of claim 11, wherein the trapezoidal waveform on the inductor of the filter is with positive peak current compared to an average inductor current, wherein when an output current of the multilevel DC-DC converter is less than zero, the inductor current includes two negative valley currents and one positive peak current during the duty cycles.

16. The pulse generator of claim 15, wherein the duty cycles are sequentially corresponding to a 0-level, an x-level and an n-level, of an output voltage of the pulse generator, wherein the 0-level of the output voltage of the pulse generator is less than the x-level of the output voltage of the pulse generator, and the x-level of the output voltage of the pulse generator is less than the n-level of the output voltage of the pulse generator.

17. The pulse generator of claim 16, wherein the 0-level of the output voltage of the pulse generator is corresponding to a falling edge of the trapezoidal waveform, wherein the x-level of the output voltage of the pulse generator is corresponding to a negative peak period of the trapezoidal waveform, wherein the n-level of the output voltage of the pulse generator is corresponding to a rising edge of the trapezoidal waveform.

18. The method of claim 11, wherein the plurality of capacitor-switch modules include four serially connected capacitor-switch modules, and each of the four parallel connected capacitor-switch modules includes a complementary pair of switches and one capacitor, wherein a gate of each switch of the four parallel connected capacitor-switch modules is coupled to the controller to receive the duty cycles.

19. The method of claim 11, wherein the plurality of capacitor-switch modules include three parallelly connected capacitor-switch modules, and each of the three parallel connected capacitor-switch modules includes a complementary pair of switches and one capacitor, wherein a gate of each switch of the three parallelly connected capacitor-switch modules is coupled to the controller to receive the duty cycles.

20. The method of claim 11, wherein the plurality of capacitor-switch modules include four capacitor-switch modules with midpoint clamps and flying capacitors, and each of the four capacitor-switch modules includes a complementary pair of switches and one capacitor, wherein a gate of each switch of the three parallelly connected capacitor-switch modules is coupled to the controller to receive the duty cycles.

* * * * *